SHEFFIELD H. WRIGHT.

Improvement in Machines for Threading Bolts.

No. 4,906. Reissued May 14, 1872.

Witnesses:

Jas. E. Hutchinson

C. L. Evert.

Inventor

Sheffield H. Wright per Alexander Mason

Attorneys.

UNITED STATES PATENT OFFICE.

SHEFFIELD H. WRIGHT, OF LOWELL, MASSACHUSETTS, ASSIGNOR, BY MESNE ASSIGNMENT, TO JONATHAN HOPE, ROBERT H. BUTCHER, AND JAMES MINTER, OF SAME PLACE.

IMPROVEMENT IN MACHINES FOR THREADING BOLTS.

Specification forming part of Letters Patent No. 119,681, dated October 3, 1871; reissue No. 4,906, dated May 14, 1872.

*To all whom it may concern:*

Be it known that I, SHEFFIELD H. WRIGHT, of Lowell, in the county of Middlesex and State of Massachusetts, have invented certain new and useful Improvements in Bolt-Cutting Machines, of which the following is a full and clear description.

The object of my invention is to produce a bolt-cutter which shall in a great measure be self-operating and require very little attendance, and cut the threads with precision and rapidity.

Figure 1:
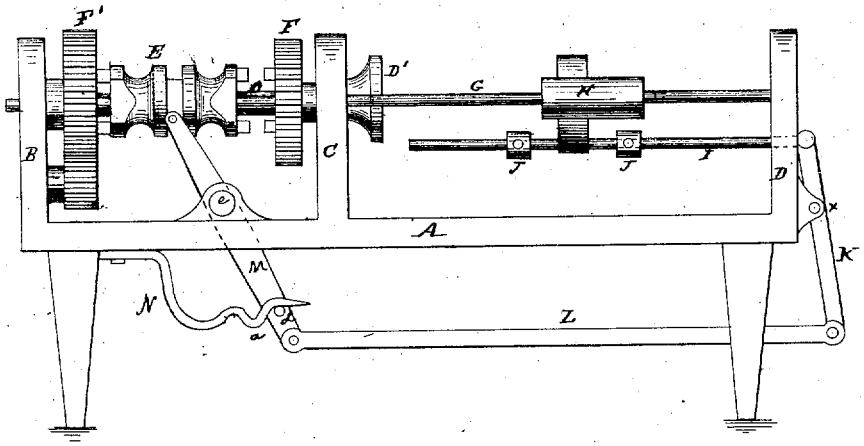
Figure 2:
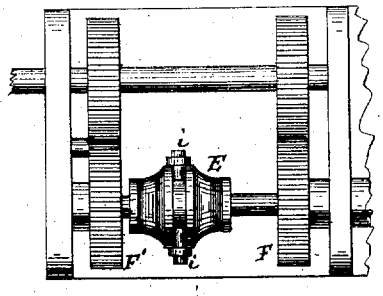
Figure 3:
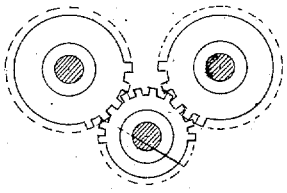

In the annexed drawing, Figure 1 represents a side view of the machine, Fig. 2 a plan of the driving shaft and gear, and Fig. 3 shows two gears and their intermediates.

In the drawing, A represents the frame of the machine, which has upon it and forming a portion of it three standards, B C D. O represents a shaft which has its bearings in the standards B and C, and which has upon one end of it a face-plate, D′, in which are dies or cutters. Playing loosely upon this shaft, when not in gear, are two gear-wheels, F F′. E represents a double clutch, which is secured upon the shaft O by means of a spline. There are teeth upon the inner faces of each of the wheels F F′, and also upon each end of the clutch E, which engage to give motion and direction to the shaft O. As this clutching device and its accompanying gearing which actuates it are not new, I will not further refer to it, or rather describe it. Two guides, G G, extend from the standard C to standard D, which form ways for supporting and guiding the bolt-holder H. A rod, I, passes through the lower portion of the bolt-holder H, and is provided with stops J J, for the purpose hereinafter described. One end of this rod connects with a lever, K, said lever having its fulcrum at *x*. The lever K connects at one end with a connecting-rod, L, and this connecting-rod in turn connects with one end of a lever, M. The lever M has its fulcrum at *e*, and one end being forked sufficiently to allow the clutch E to lie between. Upon the forks of the lever M are pins or friction-wheels, which take into the groove in the clutch for the purpose of moving it to and fro upon the shaft O. The object of this arrangement is to throw the machine in and out of gear automatically, and operates as follows: The bolt being secured in the bolt-holder H, the operator moves said holder upon the ways G toward the face-plate D′ until the end of the bolt upon which the thread is to be cut is engaged by the dies in said face-plate; then the machine begins to feed itself. One of the stops J being set upon the rod I just the length it is desired the screw should be cut, it will be seen that when the bolt-holder is brought up, by the feeding of the screw so as to strike the said stop, the rod I, lever K, rod L, and lever M are moved, and operating upon the clutch E, throw it out of gear with the clutch-wheel which is moving it, and moves it almost near enough to the opposite clutch-wheel to engage it. But to complete this movement, so that the wheel and clutch will actually engage, a spring, N, is employed. This spring, as will be seen, is formed with a hump or cam on it which works over a pin, *d*, on lever M. The pressing of one side of this cam upon the pin on the lever causes said lever M to move a little further than it otherwise would, and consequently moves the clutch a little further, and, completing the movement, causes the clutch to engage the other clutch-wheel. As this wheel has a reverse motion to the first, the shaft O, with its face-plate and dies, is reversed, and the bolt is fed out until it is disengaged from the dies. The operator then draws the holder H back until it strikes the other stop J, which again reverses the machine, causing the clutch to engage with the wheel, which gives the shaft, with its dies, a cutting motion. The operator disengages the bolt which has been cut, places in a fresh one, and moves forward the holder H until the end of the bolt is caught in the dies. The machine now feeds itself, as has been before described. It will thus be seen that very little attention is required to run the machine.

Should it be desirable, it is evident that the dies may either be cut or secured in the holder H instead of the face-plate D′, in which event the face-plate would become the holder of the bolt. The stop J at the back of the holder may be so neatly adjusted that said holder will be thrown back after the screw has been cut without the touch of the operator.

I do not wish to confine myself to the gearing represented for giving motion to the shaft O, as other devices may be used for that purpose, or to the spring N, as a weight may be used in lieu thereof.

Having thus fully described my invention, I claim—

1. The combination of a die-holder, a bolt-holder, and an automatic shipping and unshipping apparatus, constructed and arranged substantially as specified.

2. The combination of the spring N or its equivalent with the lever M and rod *z*, when used with their connecting mechanisms, substantially as and for the purpose set forth.

3. The combination of the bolt-holder H, guides G G, and die-holder D′ with the rod I and its stops J J, substantially constructed and arranged as and for the purpose set forth.

In testimony that I claim the foregoing I have hereunto set my hand this 25th day of October, 1871.

SHEFFIELD H. WRIGHT.

Witnesses:
GEO. P. BAXTER,
A. N. MARR.